US009553350B2

(12) United States Patent
DiPiero

(10) Patent No.: US 9,553,350 B2
(45) Date of Patent: Jan. 24, 2017

(54) ANTENNA MOUNT ASSEMBLY

(71) Applicant: Micro Wireless Solutions, Corp., Concord, CA (US)

(72) Inventor: Michael J. DiPiero, Concord, CA (US)

(73) Assignee: MICRO WIRELESS SOLUTIONS, CORP., Concord, CA (US)

( * ) Notice: Subject to any disclaimer, the term of this patent is extended or adjusted under 35 U.S.C. 154(b) by 0 days.

(21) Appl. No.: 14/712,682

(22) Filed: May 14, 2015

(65) Prior Publication Data

US 2016/0336641 A1  Nov. 17, 2016

(51) Int. Cl.

| A47B 96/06 | (2006.01) |
|---|---|
| A47G 29/00 | (2006.01) |
| A47K 1/00 | (2006.01) |
| E04G 3/00 | (2006.01) |
| E04G 5/06 | (2006.01) |
| F21V 21/00 | (2006.01) |
| F21V 35/00 | (2006.01) |
| H01Q 1/12 | (2006.01) |
| F16M 13/02 | (2006.01) |
| F16M 13/00 | (2006.01) |
| H01Q 9/34 | (2006.01) |
| F16M 11/20 | (2006.01) |

(52) U.S. Cl.
CPC ............ *H01Q 1/1228* (2013.01); *F16M 13/02* (2013.01); *F16M 11/2014* (2013.01); *H01Q 1/12* (2013.01); *H01Q 1/125* (2013.01); *H01Q 1/1207* (2013.01); *H01Q 1/1242* (2013.01)

(58) Field of Classification Search
CPC ........ H01Q 1/125; H01Q 1/1207; H01Q 1/12; H01Q 1/1228; H01Q 1/1242; F16M 11/2014

USPC ............... 248/219.1–219.4, 511; 343/878, 343/890–892, 874

See application file for complete search history.

(56) References Cited

U.S. PATENT DOCUMENTS 2,030,550 A * 2/1936 Smith .................. A01G 3/0255
                                                    403/312
3,917,205 A * 11/1975 Meadors .................. 248/229.17
(Continued)

FOREIGN PATENT DOCUMENTS

| CN | 203441081 U | 2/2014 |
|---|---|---|
| EP | 2309588 B1 | 4/2011 |
| GB | 2332781 A | 6/1999 |

OTHER PUBLICATIONS

Author Unknown, "Summit Mast Pipe U Bolt Saddle Clamp Antenna 1 1/4 Assembly Bracket Mast Clamp Support Antenna U-Bolt Support Mast Pipe Clamp Bracket Connection Assembly, Part #CM3082," Summit Source, [retrieved on Apr. 14, 2015] 2 pages, retrieved from: http://www.summitsource.com/summit-mast-pipe-bolt-saddle-clamp-antenna-assembly-bracket-mast-clamp-support-antenna-bolt-support-mast-pipe-clamp-bracket-connection-assembly-part-cm3082-p-8200.html.

*Primary Examiner* — Brian Mattei
*Assistant Examiner* — Taylor Morris
(74) *Attorney, Agent, or Firm* — Holzer Patel Drennan

(57) ABSTRACT

An antenna mount assembly disclosed herein provides for an efficient and elegant solution for installation of radio frequency antennas on existing wooden poles. An implementation of the antenna mount assembly includes a saddle comprising a plurality of concave plates, each of the plurality of concave plates configured to be attached to a pole. A pipe mount attachment element is welded to one of the plurality of concave plates. A pipe mount is attached to the (Continued)

pipe mount attachment element and the pipe mount is configured to attach an antenna element thereto.

14 Claims, 15 Drawing Sheets

(56) References Cited

U.S. PATENT DOCUMENTS

| | | | |
|---|---|---|---|
| 4,295,143 A * | 10/1981 | Winegard et al. ............ 343/840 |
| 4,536,102 A | 8/1985 | Doyle |
| 4,652,890 A | 3/1987 | Crean |
| 4,682,772 A | 7/1987 | Skalka |
| 4,932,623 A * | 6/1990 | Reisdorff ................. H02G 7/20 |
| | | | 248/219.3 |
| 5,340,069 A * | 8/1994 | Niemeyer ..................... 248/214 |
| 5,632,461 A * | 5/1997 | von Helms et al. ....... 248/218.4 |
| 5,641,141 A | 6/1997 | Goodwin |
| 5,867,132 A | 2/1999 | Blasing et al. |
| 5,920,291 A | 7/1999 | Bosley |
| 5,971,345 A * | 10/1999 | Khalaf .................. H01Q 1/125 |
| | | | 248/512 |
| 6,134,422 A * | 10/2000 | Bobadilla et al. ............ 455/561 |
| 6,232,928 B1 | 5/2001 | Zimmerman et al. |
| 6,262,691 B1 | 7/2001 | Austin et al. |
| 6,279,879 B1 * | 8/2001 | Statz ............................ 256/65.1 |
| 6,283,425 B1 | 9/2001 | Liljevik |
| 6,480,172 B1 | 11/2002 | Sawyer |
| 6,513,299 B1 * | 2/2003 | Damiano ................... 52/651.02 |
| 6,563,475 B2 | 5/2003 | Ianello et al. |
| 6,690,328 B2 | 2/2004 | Judd |
| 6,739,561 B2 | 5/2004 | Herzog |
| 7,004,043 B2 | 2/2006 | Erel et al. |
| 7,106,273 B1 | 9/2006 | Brunson et al. |
| 7,113,145 B1 * | 9/2006 | Noble ............................ 343/892 |
| 7,303,170 B2 | 12/2007 | Fan et al. |
| 7,374,137 B2 | 5/2008 | Staney |
| 7,659,865 B2 * | 2/2010 | Kreitzberg et al. ........... 343/880 |
| 7,683,853 B2 * | 3/2010 | Michaelis ..................... 343/878 |
| 8,023,826 B2 * | 9/2011 | Fasshauer ............ H01Q 1/1242 |
| | | | 398/115 |
| 8,305,286 B2 | 11/2012 | Frank |
| 8,305,289 B2 | 11/2012 | Lo |
| 8,593,370 B2 | 11/2013 | Caldwell et al. |
| 8,624,793 B2 | 1/2014 | Caldwell et al. |
| 2011/0279347 A1 * | 11/2011 | Pass et al. .................... 343/890 |
| 2014/0179244 A1 | 6/2014 | Colapietro et al. |
| 2014/0339383 A1 | 11/2014 | Lowe et al. |

* cited by examiner

ANTENNA MOUNT ASSEMBLY

FIELD

Implementations disclosed herein relate, in general, to the telecommunication equipment technology and specifically to technology for antenna mount equipment.

DISCUSSION OF RELATED ART

Telecommunication and information technology are as essential technologies for all modern economies. Due to advances in wireless technologies, consumers and business have come to rely on availability of access to information and content at all times. The increased amount of content being conveyed on the wireless communication spectrum makes it necessary to deploy a larger number of sites to increase the network footprint throughout cities across the nation to satisfy the bandwidth demands. As a result, telecommunication companies utilize all available avenues for installing antennas for receiving and transmitting signals.

Given the ubiquitous presence of telecommunication equipment, there has been considerable backlash, especially in residential communities, against installation of additional cell towers, etc. As a result, the telecommunication companies have incentive to use existing poles and other structures for installing their equipment. On the other hand, existing utility companies with their overhead power distribution systems have a large number of poles with unused installation space. However, using these wooden poles for installing antennas requires special consideration of rules and regulations (GO95 rules) used throughout the industry. Furthermore, there is limited space and capacity and therefore, the telecommunication companies have to take into consideration the efficient utilization of space, installation time, ease of installation, durability of equipment mounts, aesthetics, etc. These considerations necessitate new and innovative solutions for antenna mount assemblies.

SUMMARY

An antenna mount assembly disclosed herein provides for an efficient and elegant solution for installation of radio frequency antennas on existing wooden poles. An implementation of the antenna mount assembly includes a saddle comprising a plurality of concave plates, each of the plurality of concave plates configured to be attached to a pole. A pipe mount attachment element is welded to one of the plurality of concave plates. A pipe mount is attached to the pipe mount attachment element and the pipe mount is configured to attach an antenna element thereto.

Implementations of the antenna mount assemblies disclosed herein improve the ease and functionality of applying wireless antennas for "Small Cell Technology" to existing wood distribution poles within existing communities and industrial settings. Specifically, one or more of these implementations provide stealth like design with "low visual impact" combined with quick installation, which can be performed by a single user. An example of the antenna mount assembly disclosed herein provides light weight design including antenna mount brackets coupled with the carriage bolt with front locking system, which allows a user to assemble the bracket only needing to tighten the bolt on one side of the distribution pole. For example, for an antenna mount bracket including three saddle plates, this exercise is completed three times and the bracket is installed in place in under twenty (20) minutes. The antenna mount assembly may further include front mounting plate containing two (2) holes used for set screws, which allows a contractor to line up the front mounting plate to pre drilled holes in a wooden pole prior to mounting the antenna mount assembly.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTION OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features.

In the interest of clarity, not all of the routine functions of the implementations described herein are shown and described. It will, of course, be appreciated that in the development of any such actual implementation, numerous implementation-specific decisions must be made in order to achieve the developer's specific goals, such as compliance with application- and business-related constraints, and that those specific goals will vary from one implementation to another and from one developer to another.

Reference will now be made in detail to implementations of the present invention as illustrated in the accompanying drawings and the following detailed description to refer to the same or like parts.

Figure 1:
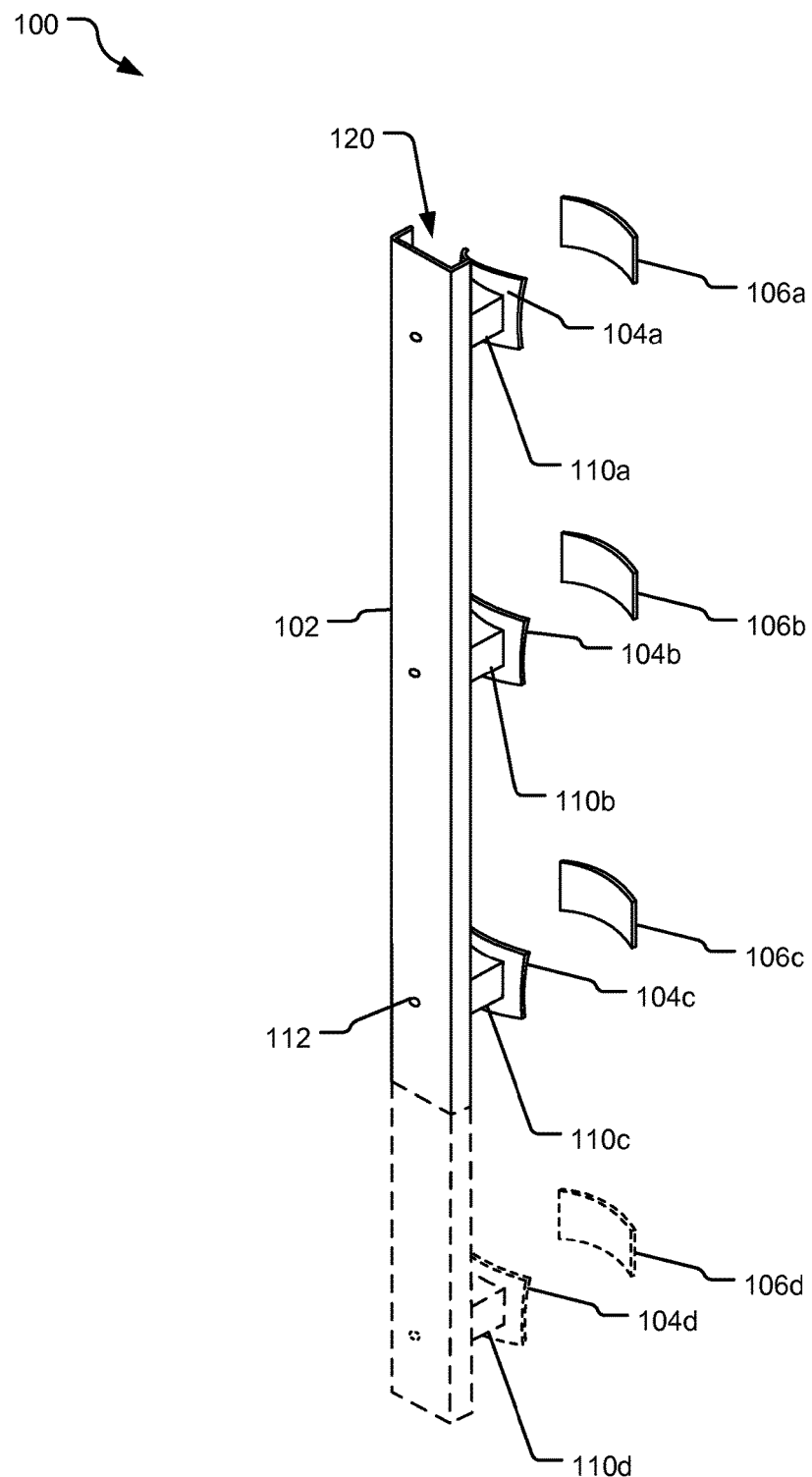
FIG. 1 illustrates an example diagram of an antenna equipment mount assembly disclosed herein.

FIG. 1 illustrates an example diagram of an antenna equipment mount assembly 100 disclosed herein. The equipment mount assembly 100 includes a bracket 102 that may be used to mount various antennas and other telecommunication equipment on a pole. Specifically, the equipment mount assembly 100 is configured to be installed on a wooden pole, such as an existing utility pole carrying power lines, etc. In the illustrated implementation, the bracket 102 is disclosed to be a C-channel bracket. However, in alternative implementations, other shape for the bracket 102 such as a bracket having tubular structure, etc., may be provided. A plurality of concave mounting plates 104a-104d (referred to herein at 104) are attached to the bracket 102 via a plurality of mount elements 110a-110d (referred to herein at 110). In one implementation, the distance between the bracket 102 and the mounting plate 104 is approximately four inches.

The mounting plates 104 are configured to be attached to a wooden pole (not shown) using a carriage bolt (not shown) that passes through the bracket 102, the mount elements 110, and the mounting plates 104. An implementation of the equipment mount assembly 100 also includes a plurality of enclosing plates 106a-106d (referred to as 106). The mounting plates 104 and the enclosing plates 106 are referred together as a saddle element.

The enclosing plates 106 also include threaded openings 114a-114d (referred to as 114) to receive a carriage bolt. To attach the equipment mount assembly 100 to a wooden pole, a carriage bolt is passed through each of threaded openings 112 of the bracket 102, the mount elements 110, the mounting plates 104, the wooden pole, and the threaded openings 114. A washer and nut maybe screwed on the other ends of the carriage bolts extending through the threaded openings 114 to secure the entire equipment mount assembly 100 to the wooden pole.

The equipment mount assembly 100 is designed such the distances between the threaded openings 112 is uniform such that before installing the equipment mount assembly 100, holes may be drilled through the wooden pole at predetermined locations to align with the threaded openings 112. Subsequently the bracket 102 and the enclosing concave plate 106 are aligned with the drilled holes and carriage bolt is threaded through them. In an implementation of the equipment mount assembly 100, each of the mount elements 110 is welded on one end to the bracket 102 and to one of the mounting plates 104 on the other hand. As a result, the equipment mount assembly 100 includes a very few movable parts. This is important to a user installing the equipment mount assembly 100 on wooden poles because the less number of parts results in ease of installation and less risk of dropping or losing parts during installation. Note that in the illustrated implementation of the equipment mount assembly 100, a plurality of enclosing plates 106 are disclosed being separate from each other, in alternative implementations, a single enclosing concave plate 106 with multiple threaded openings 114 may also be provided. Furthermore, to prevent damage to the equipment mount assembly 100 from elements affecting the wooden pole, a thin layer of neoprene (not shown) or other material may be inserted between the mounting plates 104 and wooden pole and between the enclosing plates 106 and the wooden pole.

The bracket 102 may be made of aluminum to provide lightweight and durability. The shape of the bracket 102 in the shape of a C-channel allows management of power cables, communication wires, etc., in the opening 120 between the bracket 102 and the wooden pole. Such cables, wires, etc., maybe extracted towards the outer surface of the bracket 102 by drilling holes in the bracket 102.

In one implementation, all components of the equipment mount assembly 100 are made of aluminum. To increase the durability of the equipment mount assembly 100 components of the equipment mount assembly 100 may be painted with a powder coat For example, the painting process may involve first powder coating the components, then sand blasting the components, coating with primers, and then baking the components at five hundred degrees to provide a finish that can withstand the harshest environments.

The equipment mount assembly 100 may be used to mount telecommunication equipment, including power equipment such as a battery cabinet, utility meter, dark fiber receiver, small cell antenna, etc. Some of these equipment may be installed directly on the bracket 102. On the other hand, an antenna may be installed using an antenna mount assembly (further disclosed below) installed on the equipment mount assembly 100. Typically, the equipment mount assembly 100 is installed such that the bottom end of the equipment mount assembly 100 is approximately nine feet above ground. This ensures that the equipment installed on the equipment mount assembly 100 is out of reach of humans, animals, etc. The length of the equipment mount assembly 100 may be, for example, six feet.

Figure 2:
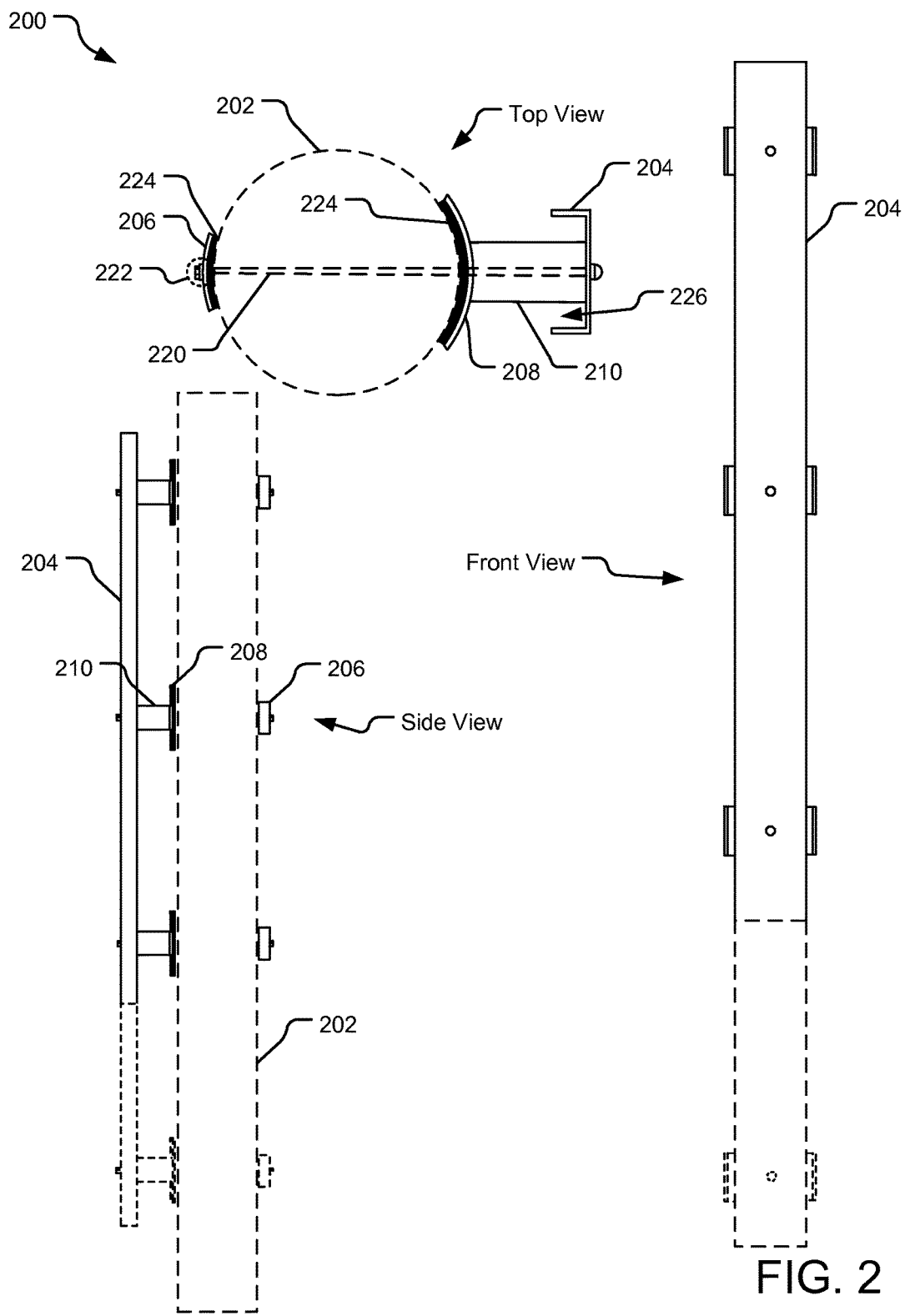
FIG. 2 illustrates an alternative view of the antenna equipment mount assembly disclosed in FIG. 1.

FIG. 2 illustrates an alternative view of the equipment mount assembly 100 (referred to as 200 in this figure) disclosed in FIG. 1. The equipment mount assembly 200 is illustrated as installed on a wooden pole 202 using mounting plates 208 and enclosing plates 206. As shown in the various views of the equipment mount assembly 100, it includes a bracket 204 that is attached to the mounting plates 208 via various mounting elements 210. Such mounting elements 210 maybe welded to the concave plate 208 on one end and to the bracket 204 on the other end.

A carriage bolt 220 passing through each of the bracket 204, the mounting element 210, the concave plate 208, the wooden pole 202, and the receiving concave plate 206 secures the equipment mount assembly 100 to the wooden pole 202. A combination 222 of a washer and a nut is used on the outer surface of the enclosing concave plate 206 to secure the carriage bolt 220 to the wooden pole 202. As illustrated in FIG. 2, a thin layer 224 of a rust proof material, such as neoprene, may be added between the mounting plates 208 and the wooden pole 202 and between the enclosing plates 206 and the wooden pole 202. The shape of the bracket 204 in the shape of a C-channel allows management of power cables, communication wires, etc., in the opening 226 between the bracket 204 and the wooden pole 202. Such cables, wires, etc., maybe extracted towards the outer surface of the bracket 204 from the opening 226 by drilling holes in the bracket 204.

Figure 3:
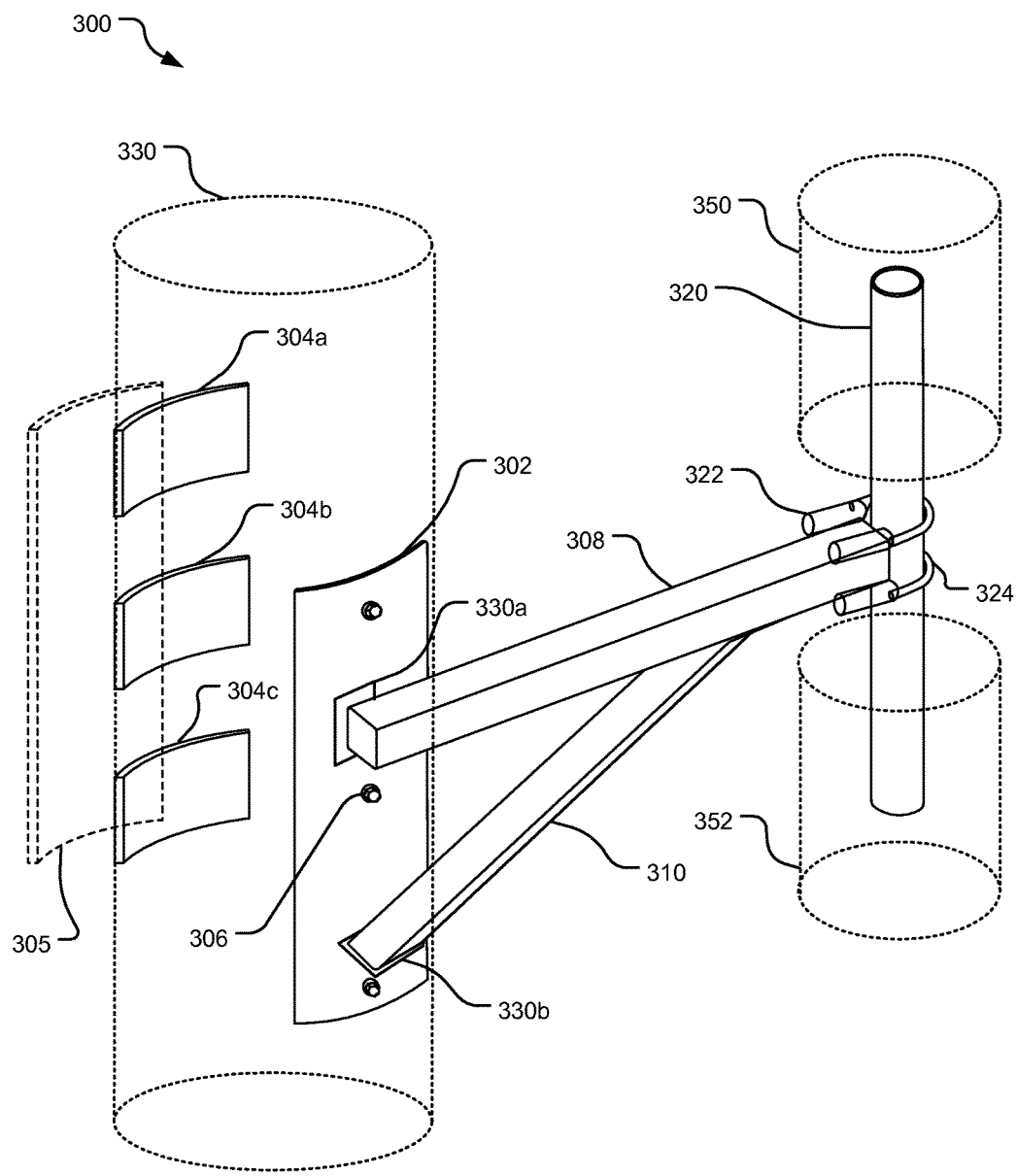
FIG. 3 illustrates an example diagram of an antenna mount assembly disclosed herein.

FIG. 3 illustrates an example diagram of an antenna mount assembly 300 disclosed herein. The antenna mount assembly 300 may include a mounting plate 302 and a plurality of mounting plates 304 to mount the antenna mount assembly 300 on a wooden pole 330. In the illustrated implementation, the mounting plates 302 and the mounting plates 304 are each of a concave shape such that they snugly fit the wooden pole 330 having a substantially circular cross-section. However, in an alternative implementation, where the shape of the wooden pole is such that the cross-section of the wooden pole is not circular, each of the mounting plates 302 and the mounting plates 304 may have an alternative shape such that they can be securely attached to such wooden pole having an alternative cross-section. Furthermore, as shown by 305, the mounting plates 304 may also be made of one piece. The mounting plates 302 and the mounting plates 304 together may be referred to as a saddle element.

The mounting plate 302 is securely and irremovably attached to a pipe mount attachment element comprising arms 308 and 310. For example, first ends of the arms 308 and 310 may be welded to the mounting plate 302 using welded joints 330a and 330b. In one implementation, the arms 308 and 310 of the pipe mount attachment element are made of hollow steel tubes having a square cross section. A second end of the arm 308 includes an attachment mechanism to attach a pipe mount 320 thereto. In implementation, such attachment mechanism includes a plurality of threaded receptors 322. The pipe mount 320 may be secured to the pipe mount attachment element using U-bolts 324 encircling the pipe mount 320. The U-bolts 324 may be passed through the receptors 322 and secured thereto using capped nuts (not shown) on the other end of the receptors.

The antenna mount assembly 300 is secured to the wooden pole 330 using carriage bolts, such as the carriage bolt 306 passing through the mounting plate 302, the wooden pole 330, and the enclosing mounting plate 304. A combination of a washer and a capped nut (not shown) may be used on the outer surface of the mounting plates 304 to secure the carriage bolt 306 to the antenna mount assembly 300. Furthermore, in one implementation, a thin layer of non-corrosive material (not shown) such as neoprene may be located between the mounting plate 302 and the wooden pole 330 and between the wooden pole 330 and the mounting plates 304.

The antenna mount assembly 300 allows installing two antenna elements 350 and 352 on the pipe mount 320. Specifically, each of the antenna elements 350 and 352 may include an antenna element that is used to communicate using small cell technology. One or more wires carrying signals to and from such antenna elements, power line wires, etc., can be carried to such antenna elements along the arms 308 and 310 of the antenna mount assembly 300.

Figure 4:
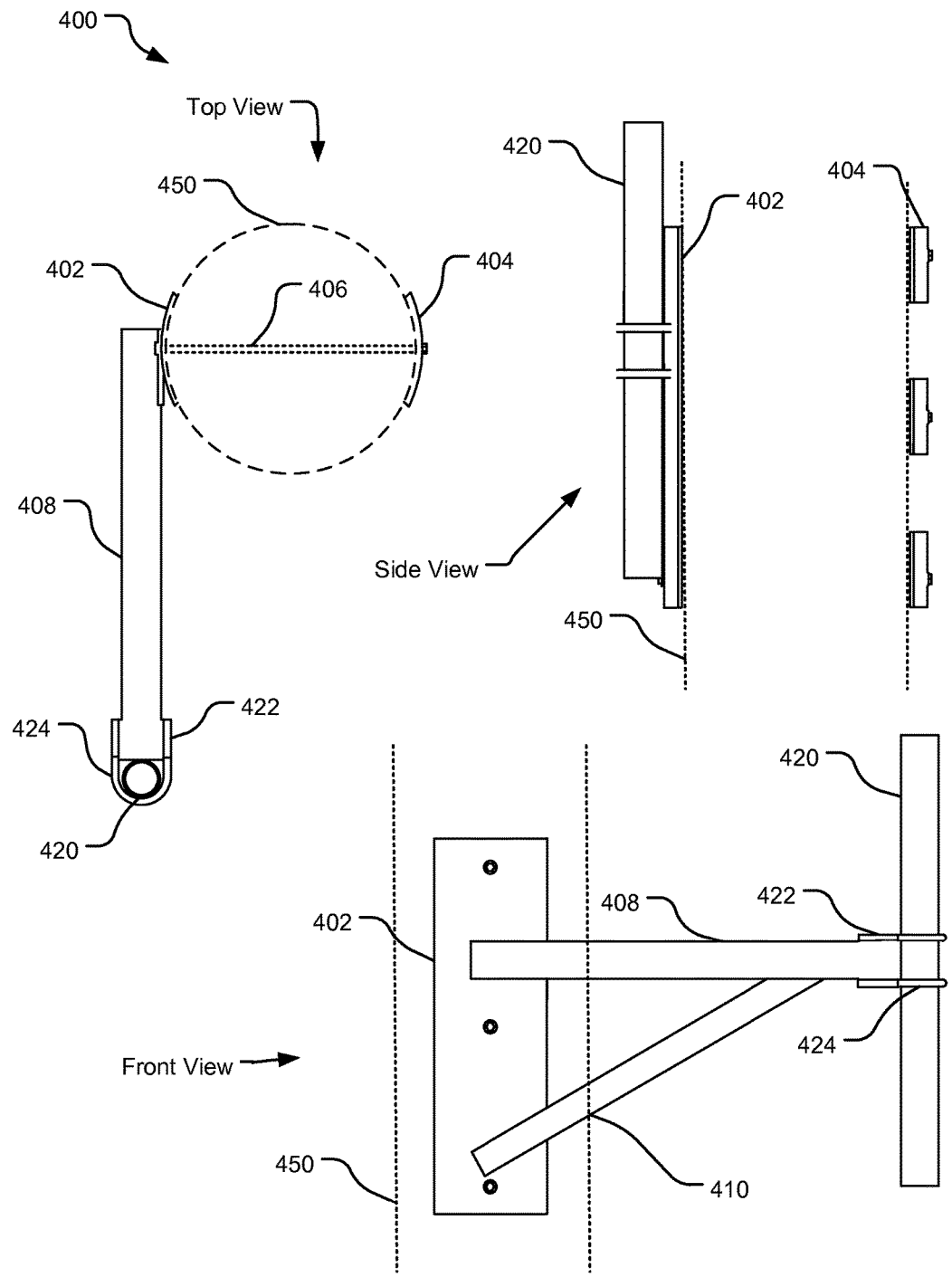
FIG. 4 illustrates alternative views of the antenna mount assembly disclosed in FIG. 3.

Now referring to FIG. 4, it illustrates alternative views of the antenna mount assembly 400 disclosed in FIG. 3. Specifically, the antenna mount assembly 400 is illustrated as installed on a pole 450, which may be, for example, a wooden pole. Mounting plates 402 and mounting plate 404 are secured to the pole 450 using a carriage bolt 406. A mounting element 408 is irremovably attached to the mounting plate 402. For example, the mounting element 408 may be welded to the mounting plate 402 on one end. Another end of the mounting element is configured with one or more U-bolt receiving elements 422. A pipe mount 420 may be attached to the mounting element 408 using the U-bolt receiving elements 422 together with one or more U-Bolts 424. In one implementation, the mounting element 408 may comprise an upper arm 408 and a lower arm 410. The pipe mount 420 may be used to install one or two four feet/350 panel antennas thereon.

Figure 5:
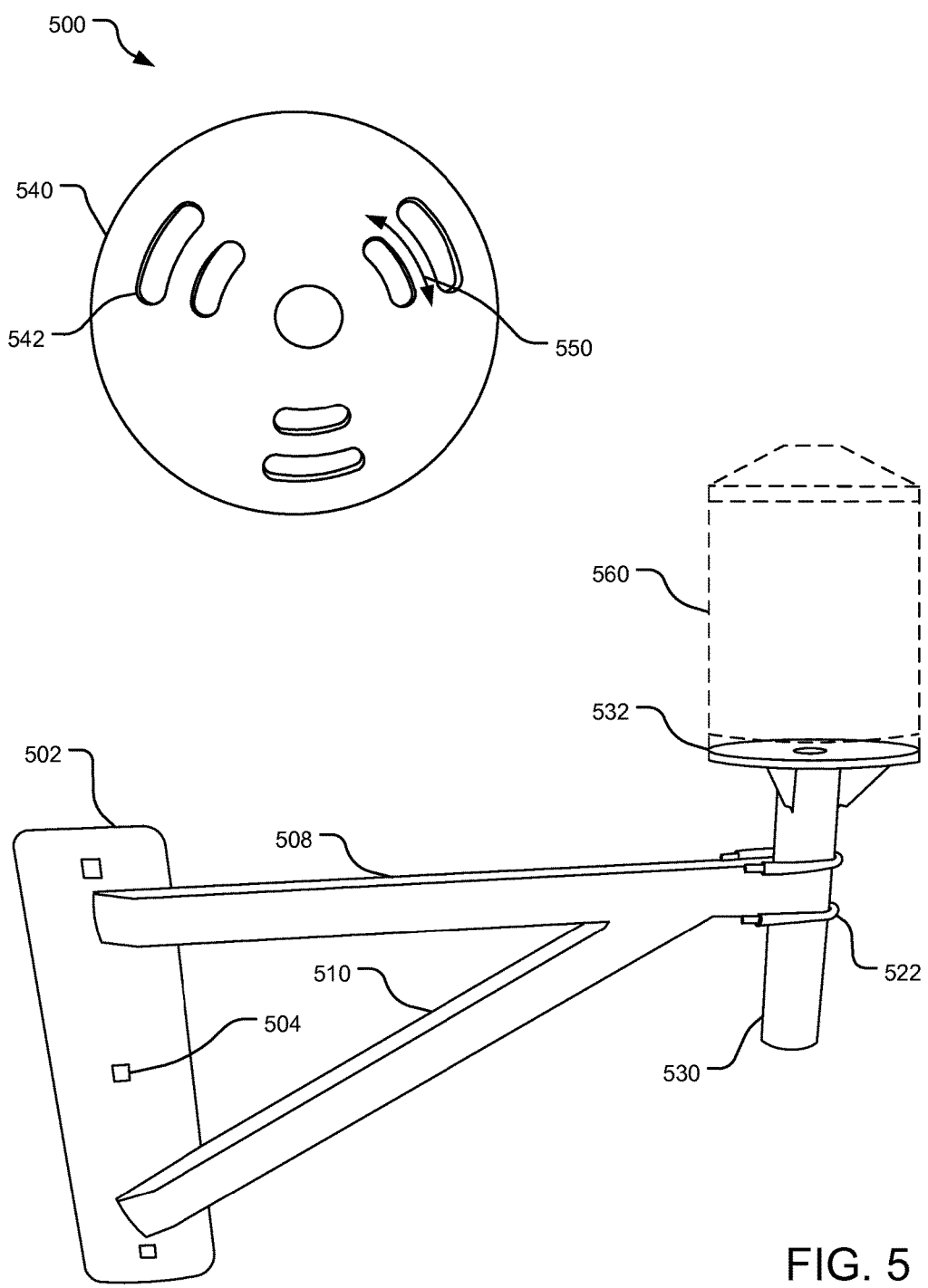
FIG. 5 illustrates an example diagram of an alternative antenna mount assembly disclosed herein.

FIG. 5 illustrates an example diagram of an alternative antenna mount assembly 500 disclosed herein. The Antenna mount assembly 500 includes a mounting plate 502 that maybe be attached to a pole. The shape of the mounting plate 502 depends on the shape of the pole. For example, for a circular wooden pole, the mounting plate 502 may be in the shape of a concave plate with a plurality of threaded holes 504 for receiving one or more carriage bolt to attach the mounting plate 502 to the wooden pole. A mounting element comprising an upper arm 508 and a lower arm 510 is securely and irremovably attached to the mounting plate 502 by, for example welding, at one end.

Another end of the mounting element may be attached to a pipe mount 530 using U-bolts 522. In the illustrated implementation, the pipe mount 530 is configured at its vertically top end to have a substantially circular and flat surface 532. The surface 532 may be used to install an antenna element thereon. FIG. 5 also illustrates a plan view 540 of the top surface 532. As illustrated therein, the top surface 532 includes a plurality of concentric openings in the shape of arcs. A cylindrical antenna element (not shown), such as a dual phase Amphenol antenna element, may be installed on the top surface 532 and secured thereto using threaded bolts passing through the openings 542 into threaded openings at the bottom of the cylindrical antenna element. The arc shaped openings on the top surface 540 allows rotating the cylindrical antenna elements around a vertical axis of the pipe mount 530 (as further illustrated by the arc 550. Such configuration of the top surface 540 allows the antenna element to be rotated to different azimuthal directions before they are affixed to the pipe mount 530. As shown in FIG. 5, an omni-mount antenna 560 may be rotatably installed on the top surface 532.

Figure 6:
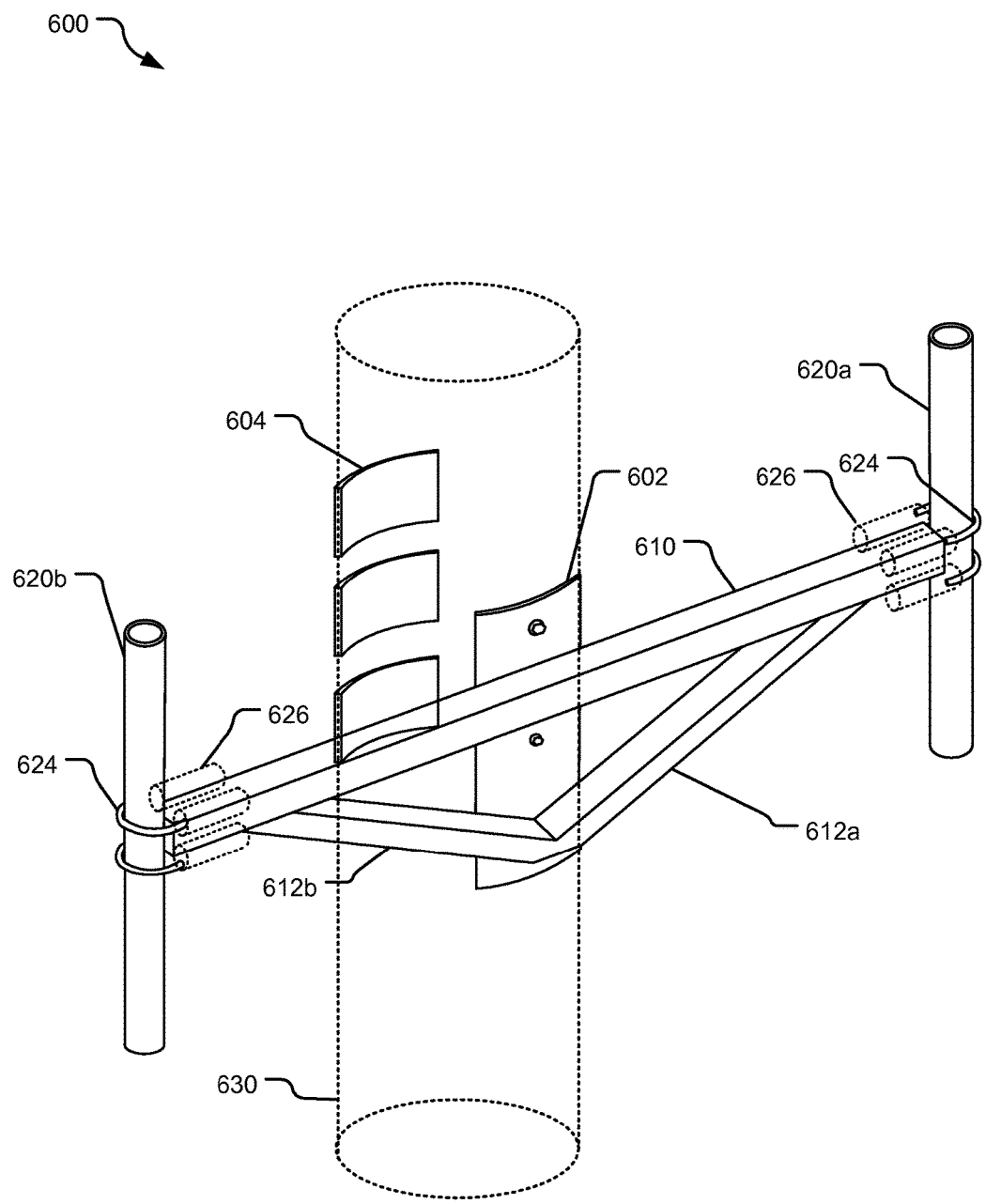
FIG. 6 illustrates an example block diagram of yet another antenna mount assembly disclosed herein.

FIG. 6 illustrates an example block diagram of yet another antenna mount assembly 600 disclosed herein. The antenna mount assembly 700 is illustrated to include a mounting plate 602 and a plurality of enclosing plates 604 that may be secured to a wooden pole 630 using carriage bolts (not shown). The mounting plate 602 is further attached to a mounting element comprising an upper arm 610 and lower arms 612a, 612b, each made of tube steel. For example, the upper arm 610 and the lower arms 612a, 612b may be irremovably attached to the mounting plate 610 by welding. Specifically, the upper arm 610 is attached to the mounting plate 602 approximately at the center of the upper arm 610.

Each end of the upper arm 610 may be configured to include a plurality of U-bolt receptors 626. After securely attaching the mounting plate 602, and therefore the mounting element, to the wooden pole 630, pipe mounts 620a and 620b are attached to the far ends of the upper arm 610 using U-bolts 624. Each of the pipe mounts 620a and 620b may be used to install two antenna elements, one above the upper arm 610 and one below the upper arm 610. Thus, the antenna mount assembly 600 allows installation of up to four antenna elements to a wooden pole.

Figure 7:
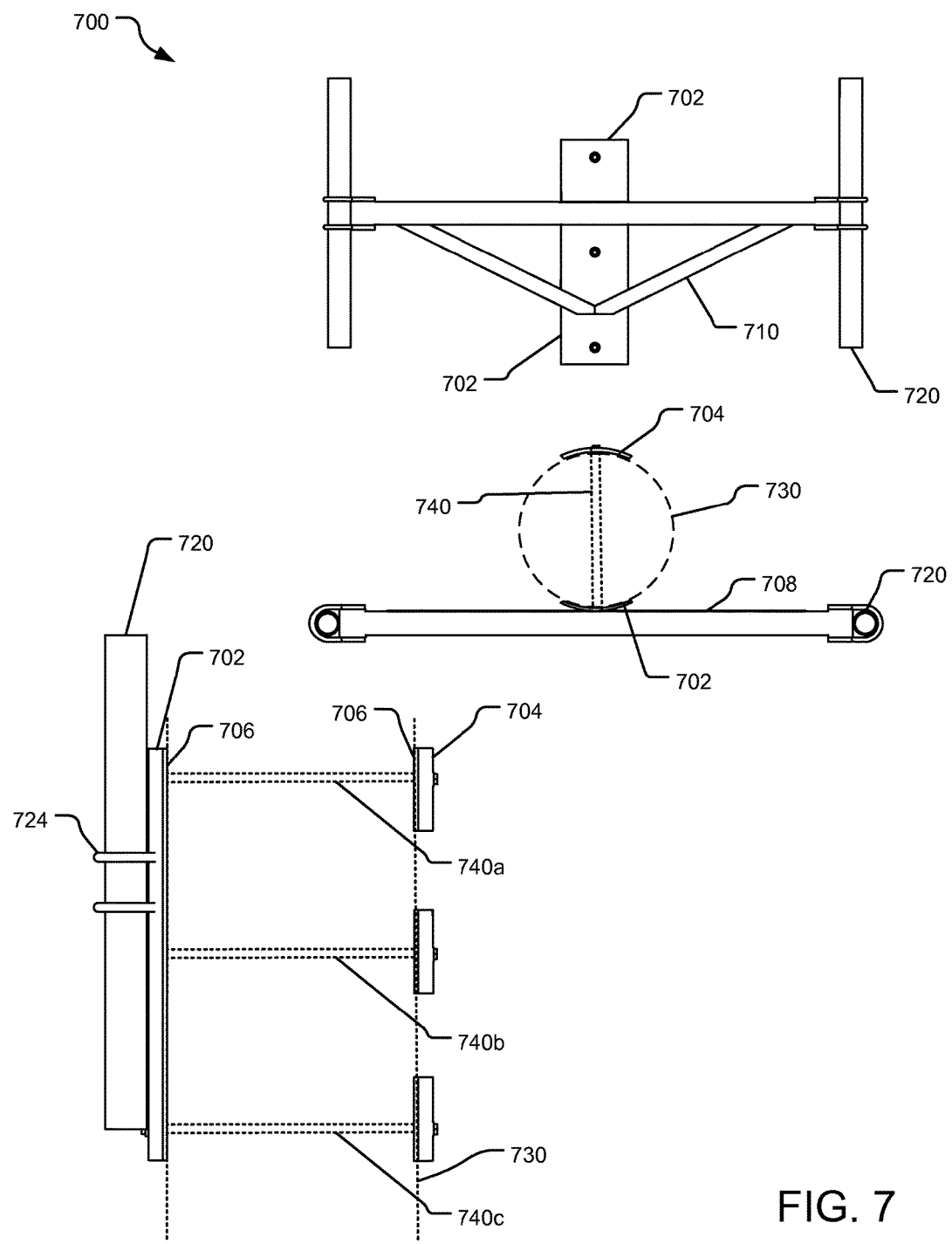
FIG. 7 illustrates alternative views of the example antenna mount assembly disclosed in FIG. 6.

FIG. 7 illustrates alternative views of the example antenna mount assembly 700 disclosed in FIG. 6. Specifically, FIG. 7 illustrates attachment of a mounting plate 702 using a carriage bolts 740a, 740b, 740c (referred to as 740) passed through a wooden pole 730 and an enclosing plate 704. Furthermore, FIG. 7 also illustrates that a layer 706 of insulating noncorrosive material is used between the mounting plate 702 and the wooden pole 730 as well as between each of the enclosing plates 704 and the wooden pole 730. A mounting element comprising an upper arm 708 and lower arms 710 is attached to the mounting plate 702 wherein far ends of the upper arm 708 are configured to attach pipe mount 720 using U-bolt receptors 722 and U-bolts 724. The lower arms 710 provide load-bearing support to the upper arm 708.

Figure 8:
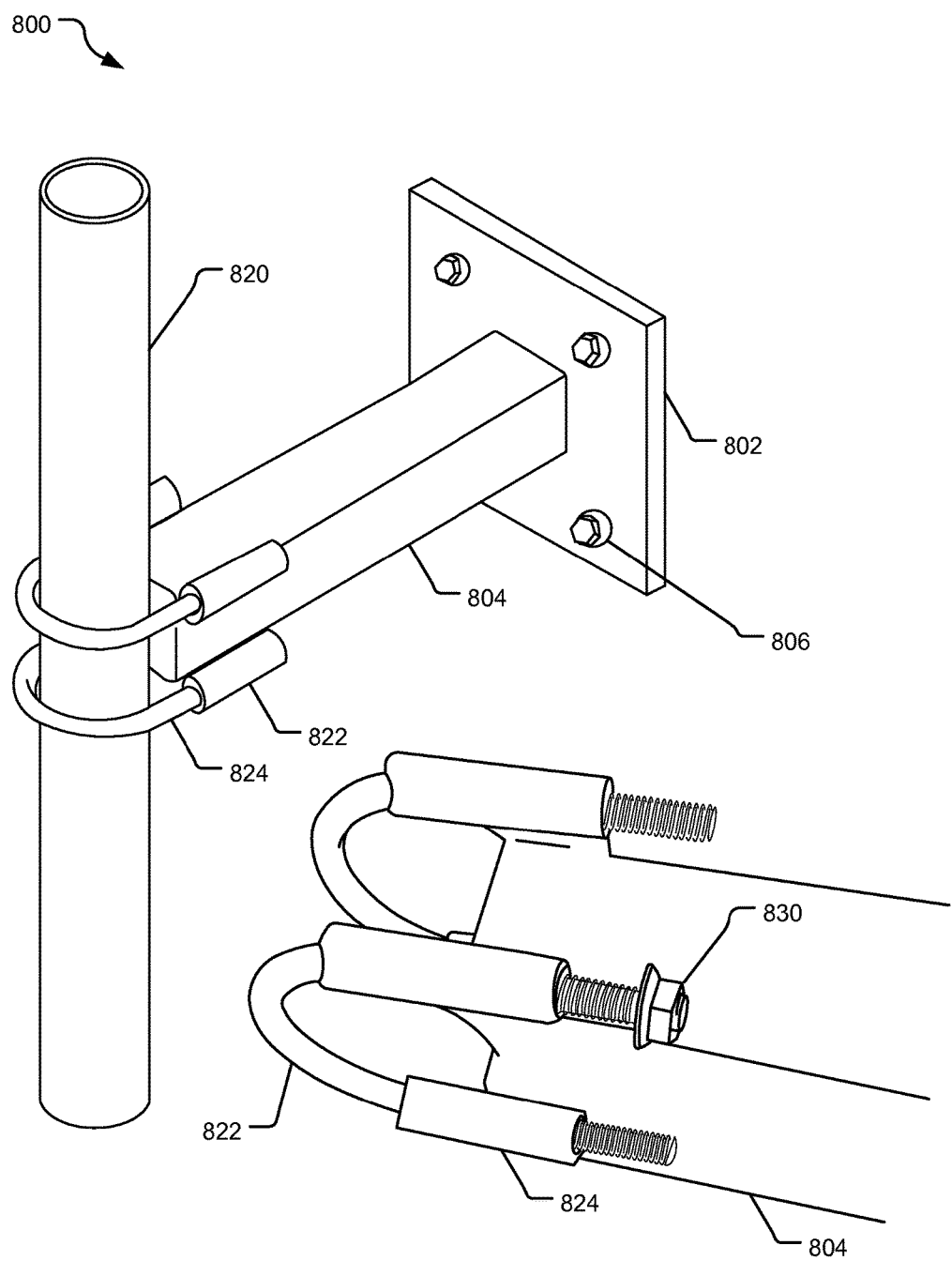
FIG. 8 illustrates an example block diagram of yet another antenna mount assembly disclosed herein.

FIG. 8 illustrates an example block diagram of yet another antenna mount assembly 800 disclosed herein. The antenna mount assembly 802 may be attached to an antenna equipment mount, such as the one illustrated above in FIGS. 1 and 2. The antenna mount assembly 800 includes a base plate 802 that may be attached to an antenna equipment mount using bolts 806. A mount element 804, which may be made of tube steel, is irremovably attached to the base plate 802 on one end and on another end the mount element 804 is configured to include a plurality of U-bolt receptors 822 to attach a pipe mount 820 to the mount element 804 using U-bolts 824. FIG. 8 also illustrates a detailed view of the attachment of the U-Bolt 822 and securing of the U-bolts using capped nuts 830.

Figure 9:
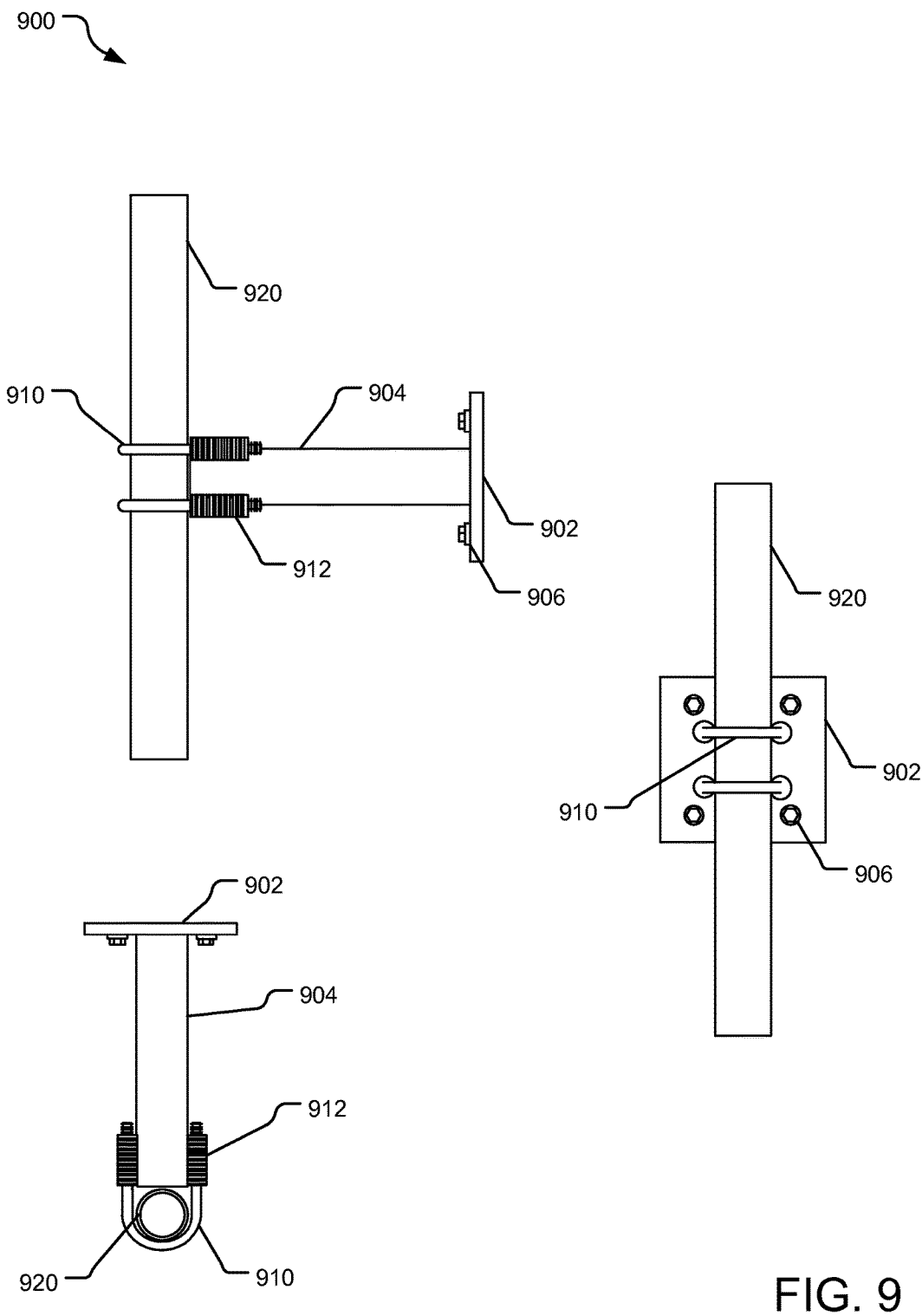
FIG. 9 illustrates alternative views of the example antenna mount assembly disclosed in FIG. 8.

FIG. 9 illustrates alternative views of the example antenna mount assembly 900 disclosed in FIG. 8. Specifically, a base plate 902 of the antenna mount assembly 900 is secured to an antenna equipment mount using bolts 906. The base plate 902 is welded to one end of a mount element 904 and another end of the mount element 904 is configured to attach a pipe mount 920 using U-bolts 910 securely fastened to U-bolt receptors 912. The pipe mount 920 may be able to hold two remote radio units (RRUs) back to back (one on top of the U-bolts 910 and another below the U-bolts 910) to maximize space usage.

Figure 10:
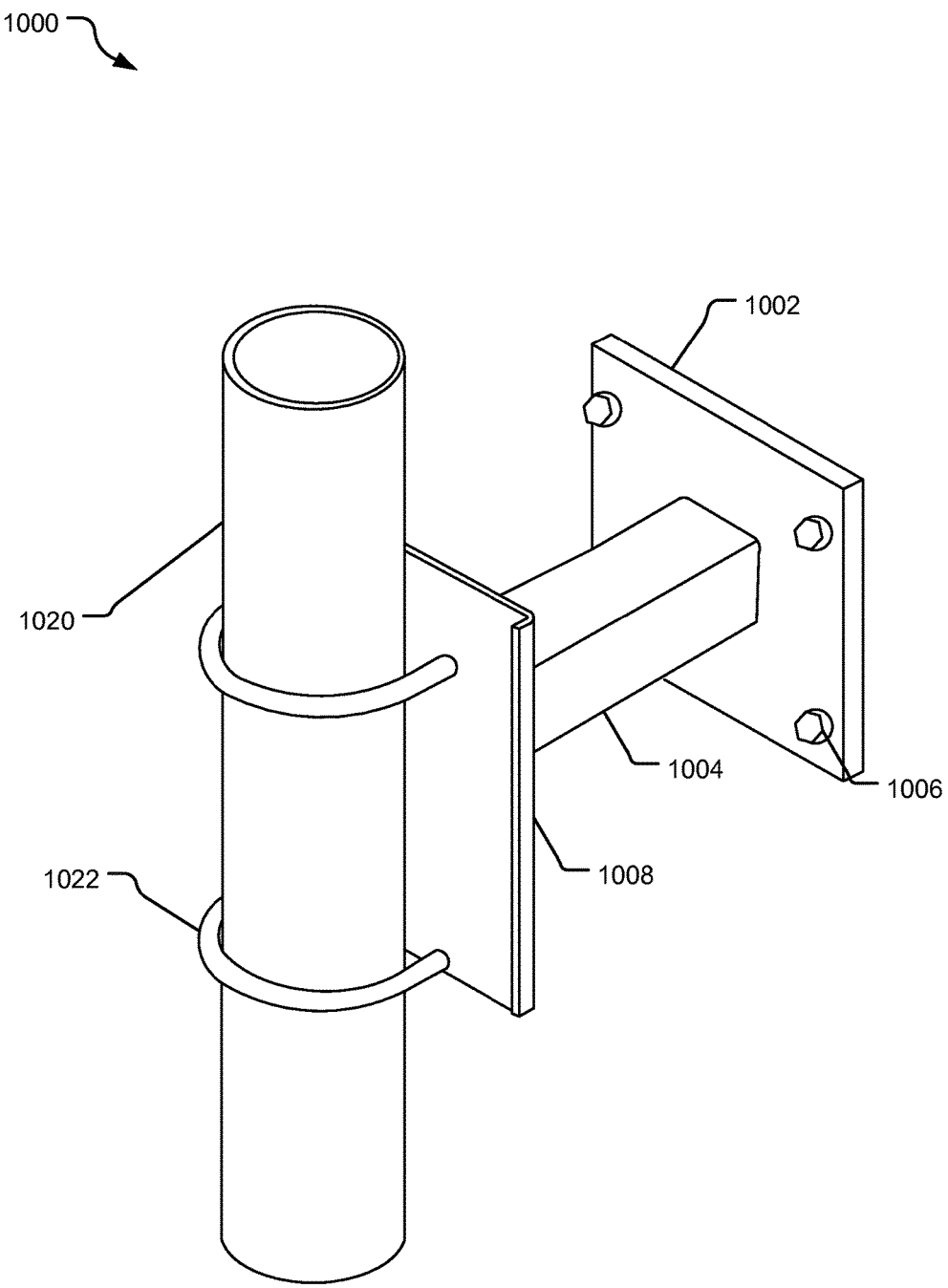
FIG. 10 illustrates an example block diagram of yet another antenna mount assembly disclosed herein.

FIG. 10 illustrates an example block diagram of yet another antenna mount assembly 1000 disclosed herein. Specifically, the antenna mount assembly 1000 includes a base plate 1002 that may be securely attached to an antenna equipment mount assembly, such as the one disclosed in FIGS. 1 and 2, using bolts 1006. One end of a mount element 1004, which may be made of tube steel, may be welded to the base plate 1002. Another end of the mount element 1004 is welded to a U-bolt connector plate 1008 having four openings for receiving ends of two U-Bolts. A pipe mount 1020 maybe be secured to the antenna mount assembly 1000 using U-bolts 1022.

Figure 11:
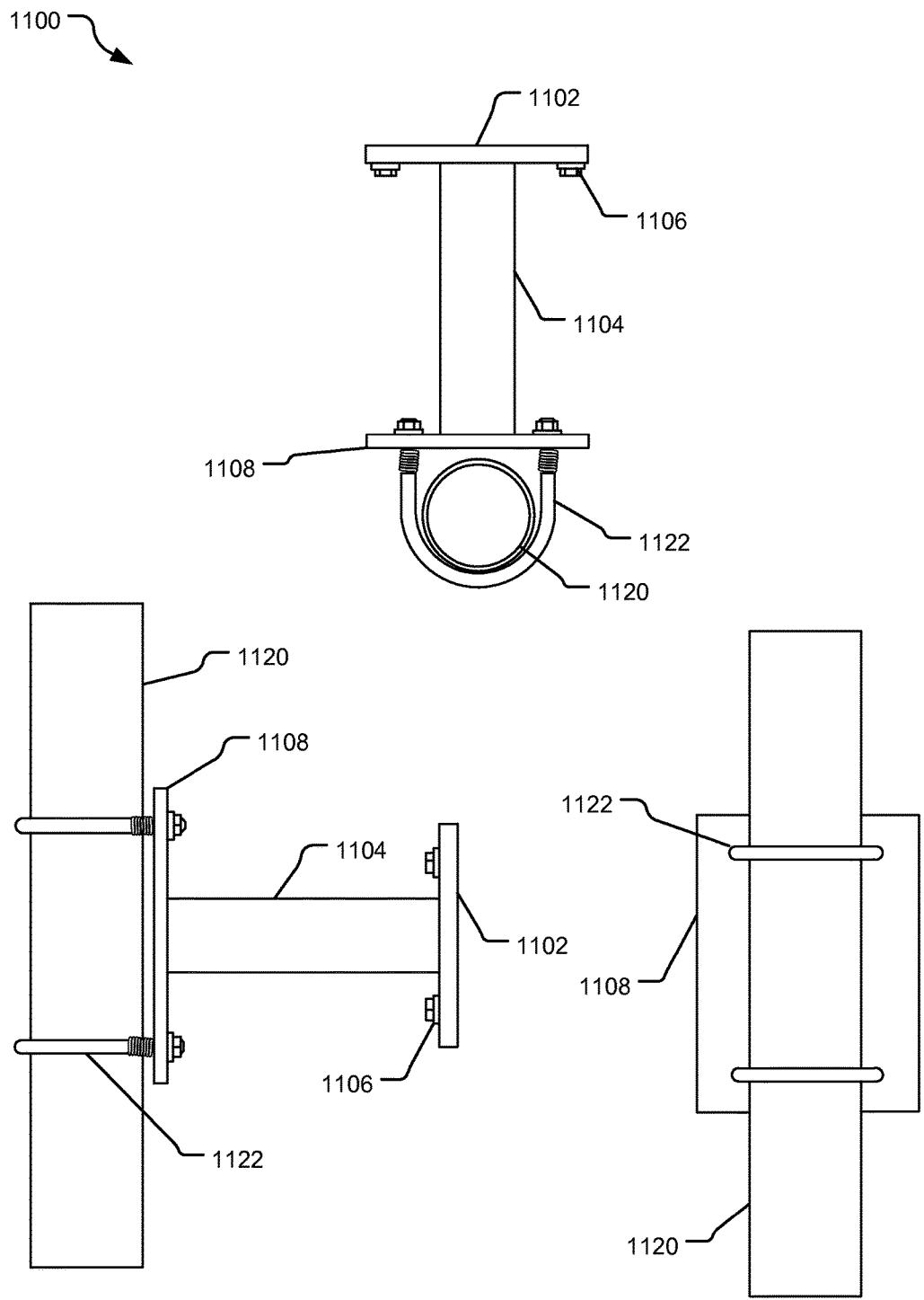
FIG. 11 illustrates alternative views of the example antenna mount assembly disclosed in FIG. 10.

FIG. 11 illustrates alternative views of the example antenna mount assembly 1100 disclosed in FIG. 10. Specifically, FIG. 11 illustrates a base plate 1102 welded to a mount element 1104 at one end, wherein another end of the mount element 1104 is welded to a U-bolt connector plate 1108. A pipe mount 112 that is configured to attach one or more antenna elements is secured to the antenna mount assembly 1100 using U-bolts 1122 through the U-bolt connector plate 1108.

Figure 12:
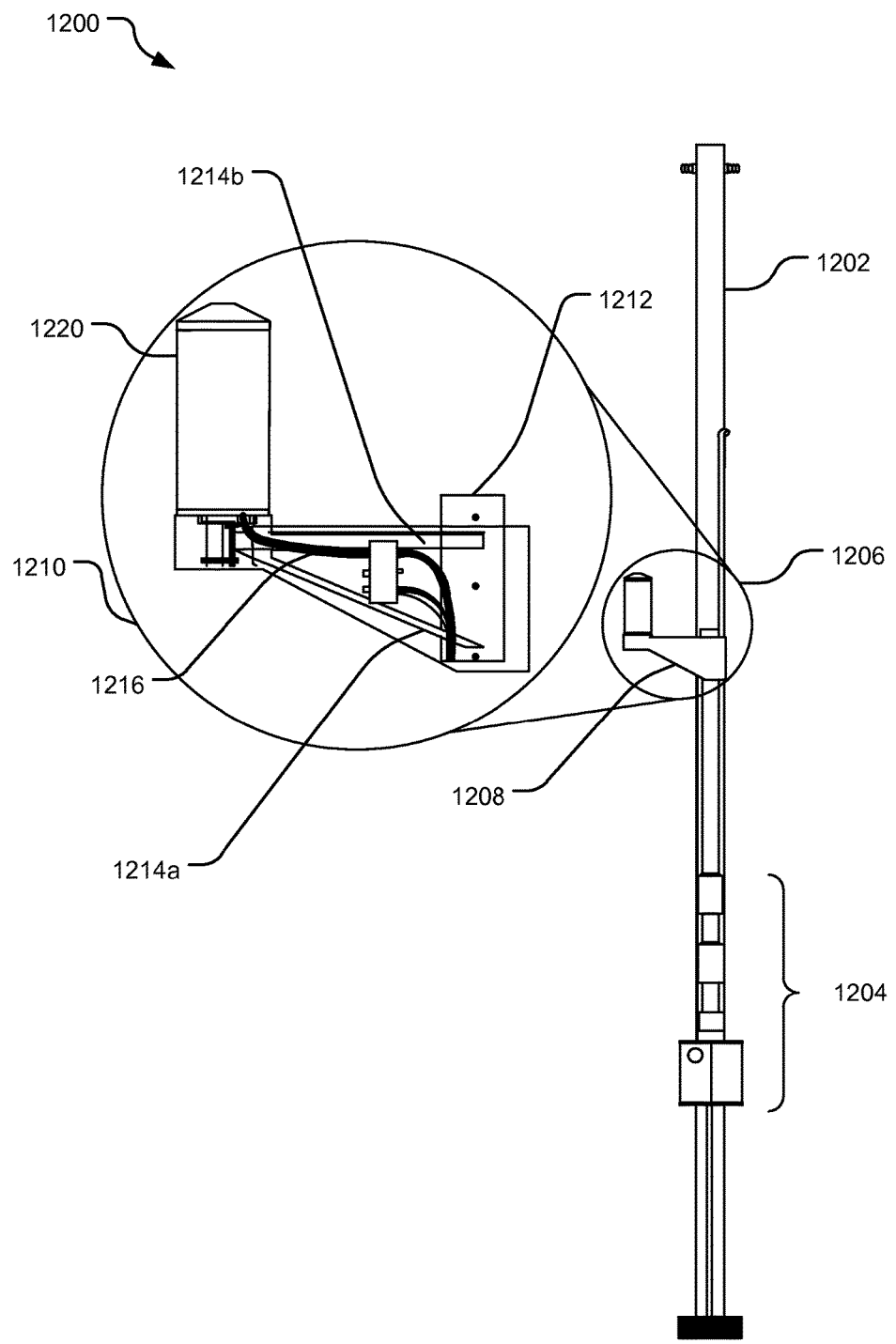
FIG. 12 illustrates an example block diagram of installation of an antenna mount with antenna on a pole.

FIG. 12 illustrates an example block diagram 1200 of installation of an antenna mount with antenna on a pole. Specifically, the block diagram 1200 illustrates the mounting of an equipment mount 1204 and an antenna mount assembly 1206 on a pole 1202, such as a utility pole, etc. The equipment mount 1204 may be used to install various equipment, such as a battery pack, a remote radio unit (RRU), etc., using an antenna equipment mount assembly, such as the one disclosed in FIGS. 1 and 2.

The antenna mount assembly 1206 is used to install antenna equipment. In the illustrated implementation, the antenna mount assembly 1206 is illustrated to include a shroud component 1208 that allows hiding various components of the antenna mount assembly, various wirings, etc., from view. FIG. 12 also illustrates and expanded view 1210 of the antenna mount assembly 1206. The antenna mount assembly 1206 includes a concave mounting plate 1212 that is attached to a pipe mount attachment element comprising a lower arm 1214a and an upper arm 1214b. In one implementation, the arms 1214a and 1214b are unmovably attached to the mounting plate 1212 by, for example, welding the arms 1214a and 1214b to the mounting plate 1212. Various wires 1216, such as signal wire, power lines, etc., may be hidden behind the shroud component 1208. The shroud component 1208 may be attached to the mounting plate 1212 using the same U-bolts that are used to attach the mounting plate 1206 to the pole 1202. Thus, for example, the shroud component 1208 may be provided with threaded openings to receive the U-bolts. An antenna element, such as an omni-mount antenna 1220 may be attached on top of a pipe mount of the antenna mount assembly 1206.

Figure 13:
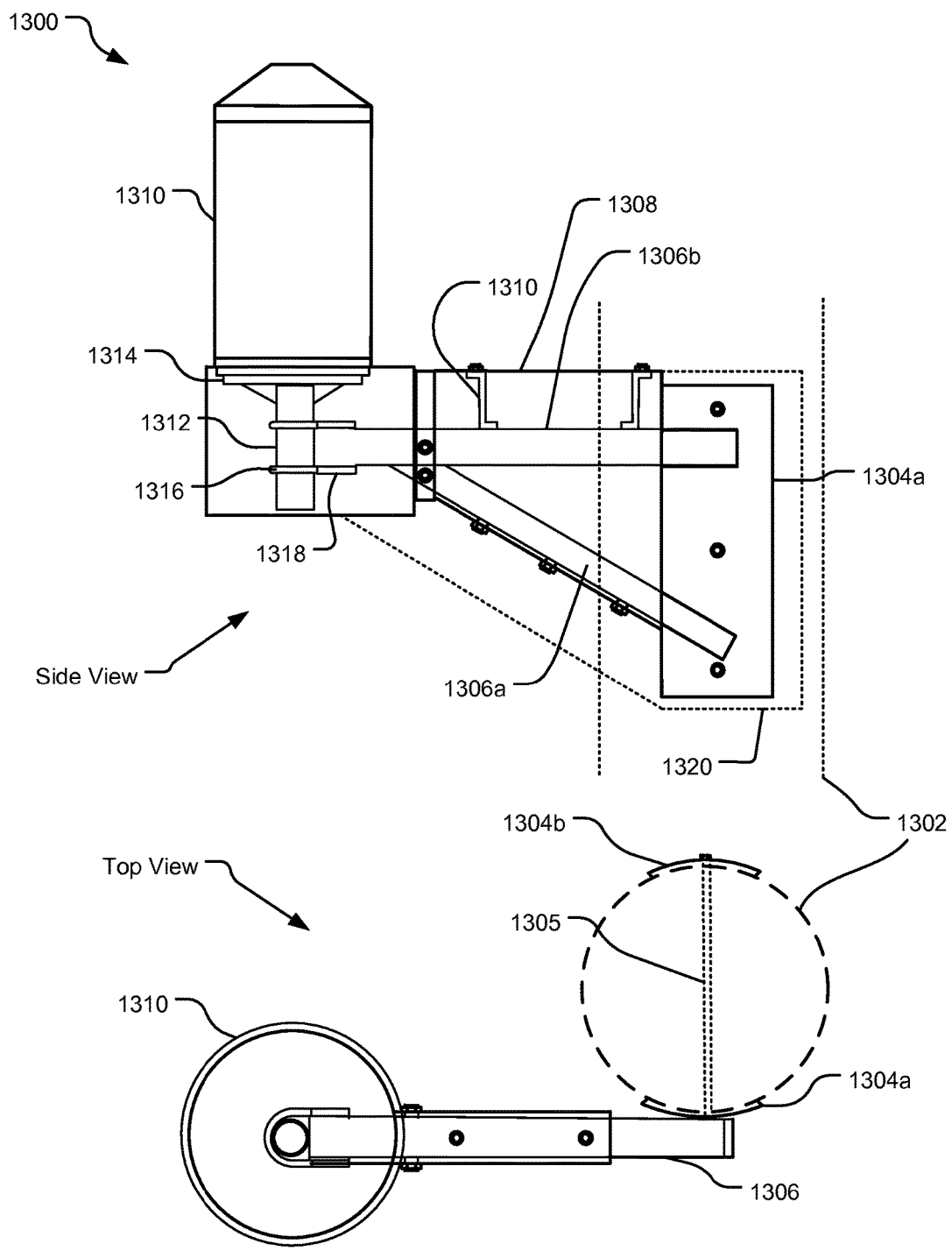
FIG. 13 illustrates alternative views of the installation of an antenna mount with antenna on a pole.

FIG. 13 illustrates alternative views 1300 of the installation of an antenna mount with antenna on a pole. Specifically, FIG. 13 illustrates an antenna element 1310 installed on a pole 1302 using an antenna mount assembly. The antenna mount assembly includes a concave mounting plate 1304a and a concave enclosing plate 1304b that may be affixed to the pole 1302 using one or more carriage bolts 1305. A pipe mount attachment 1306 including an upper arm 1306b and a lower arm 1306a are attached to the mounting bracket 1034a, for example, by welding the arms to the mounting bracket 1304a. A pipe mount 1312 is attached to the pipe mount attachment using U-bolts 1316 and on or more U-bolt receptors 1318 located on one end of the upper arm 1306b.

The pipe mount 1312 is provided with a disc 1314 at a top end that may be used to rotatably attach the antenna element 1310 to the antenna mount assembly. For example, the antenna element 1310 may be an omni-mount antenna. A shroud component 1320 is affixed to the mounting plate 1304a. Furthermore, the shroud element 1320 may also be attached to the upper arm 1306b using connectors 1310 that connects the top surface 1308 of the shroud component 1320 to the upper arm 1306b.

Figure 14:
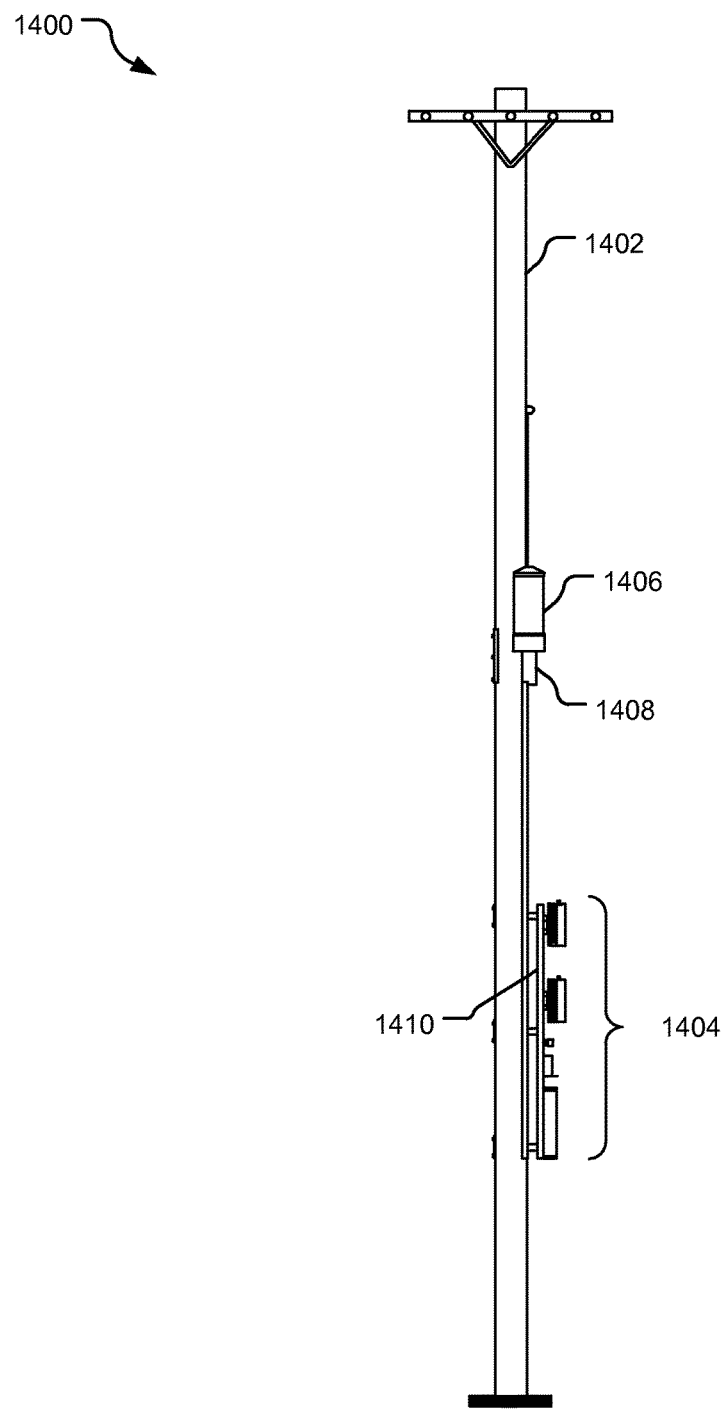
FIG. 14 illustrates yet alternative views of the installation of an antenna mount with antenna on a pole.

FIG. 14 illustrates yet alternative view 1400 of the installation of an antenna mount with antenna on a pole. Specifically, FIG. 14 illustrates an omni-mount antenna element 1406 installed on a pole 1402 using an antenna mount assembly 1408 (partially shown and as further disclosed above in various figures). Furthermore, various equipment 1404, such as RRUs, battery packs, etc., are installed on the pole 1402 using an equipment mount 1410 (partially shown and as further disclosed above in various figures).

Figure 15:
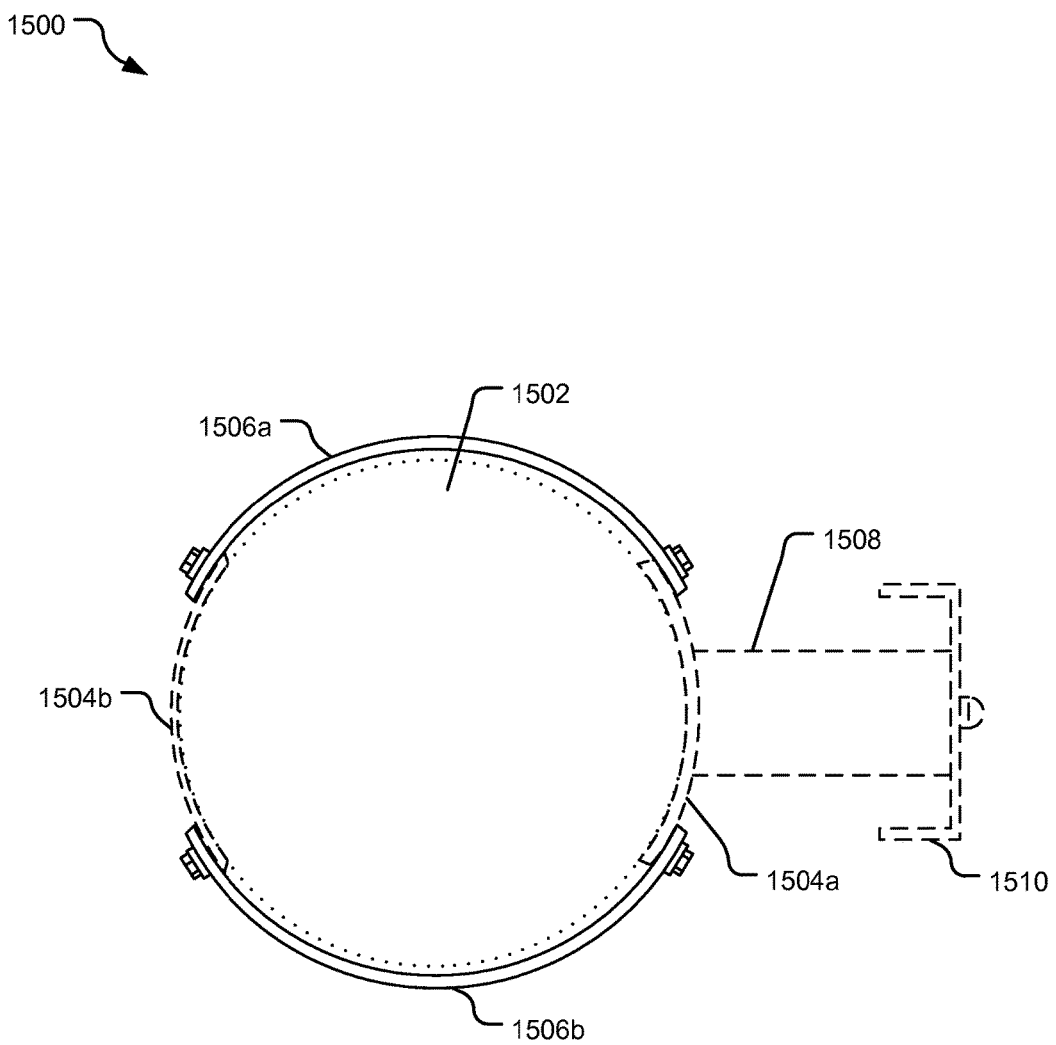
FIG. 15 illustrates an alternative example implementation of an antenna mount apparatus using a band mount.

FIG. 15 illustrates an alternative example implementation 1500 of an equipment mount apparatus using a band mount. Specifically, FIG. 15 illustrates an antenna mount assembly including a concave mounting plate 1504a and an enclosing plate 1504b that are attached to a pole 1502 using a band mount including band mount plates 1506a and 1506b. A C-channel bracket 1510 that may be used to mount various equipment is unmovably attached to the mounting plate 1504a using a plurality of mount elements 1508. Note that while the band mount plates 1506 are illustrated here to install an equipment mount, they may also be used to install one more antenna mounts disclosed herein.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. An antenna mount assembly, comprising:
   a saddle element comprising a plurality of concave mounting plates, each of the plurality of concave mounting plates configured to be attached to a wooden pole, wherein each of the plurality of concave plates has an inner concave surface with a curvature similar to the curvature of the wooden pole and a concave outer surface;
   a pipe mount attachment element irremovably attached to the concave outer surface of one of the plurality of concave mounting plates;
   a pipe mount attached to the pipe mount attachment element using at least two U-bolts, wherein the pipe mount attaches one or more antenna elements thereto;
   wherein each of the concave mounting plates is attached to the wooden pole using one or more carriage bolts wherein the carriage bolts are inserted through at least two of the plurality of concave mounting plates positioned on opposite sides of the wooden pole and through the wooden pole.

2. The antenna mount assembly of claim 1, wherein the pipe mount attachment element is further configured to include at least two U-bolt receptors.

3. The antenna mount assembly of claim 1, wherein the pipe mount attachment element is welded to the one of the plurality of concave mounting plates.

4. The antenna mount assembly of claim 1, wherein the pipe mount is a hollow cylindrical pipe and it is configured to attach two antenna elements thereto.

5. The antenna mount assembly of claim 1, wherein the pipe mount attachment element is configured to attach one pipe mount at each of two opposite ends of the pipe mount attachment element.

6. An antenna mount assembly to mount one or more antenna elements, the assembly comprising:
   a saddle element comprising a plurality of concave mounting plates, each of the plurality of concave mounting plates configured to be attached to a pole using carriage bolts wherein the carriage bolts are inserted through at least two of the plurality of concave mounting plates positioned on opposite sides of a wooden pole and through the wooden pole;
   a pipe mount attachment element irremovably welded to one of the plurality of concave mounting plates, wherein the pipe mount attachment element includes two arms, wherein the two arms are attached to each other so as to form a triangle between the two arms and the one of the plurality of concave mounting plates; and
   a pipe mount attached to the pipe mount attachment element, wherein the pipe mount is configured to attach the one or more antenna element thereto.

7. The antenna mount assembly of claim 6, wherein the curvature of each of the plurality of concave mounting plates is substantially similar to the curvature of the pole.

8. The antenna mount assembly of claim 6, wherein one end of each of the two arms being welded to the one of the plurality of concave mounting plates.

9. The antenna mount assembly of claim 6 wherein the plurality of concave mounting plates includes two or more concave mounting plates opposite the one of the plurality of concave mounting plates attached to the pipe mount attachment element.

10. The antenna mount assembly of claim 9, wherein the two or more concave mounting plates receive the carriage bolts attaching the one of the plurality of concave mounting plates attached to the pipe mount attachment element to the pole.

11. The antenna mount assembly of claim 10, wherein the pipe mount attachment element is further configured to include at least two U-bolt receptors.

12. An antenna mount assembly, comprising:
   a saddle element comprising a plurality of concave mounting plates, each of the plurality of concave mounting plates configured to be attached to a wooden pole, wherein each of the plurality of concave plates has an inner concave surface with a curvature similar to the curvature of the wooden pole and a concave outer surface;
   a pipe mount attachment element irremovably attached to one of the plurality of concave mounting plates, the pipe mount attachment element including a U-bolt receptor at one end;
   the pipe mount attachment element irremovably welded to one of the plurality of concave mounting plates, wherein the pipe mount attachment element includes two arms, wherein the two arms are attached to each other so as to form a triangle between the two arms and the one of the plurality of concave mounting plates; and
   a pipe mount attached to the pipe mount attachment element using at least two U-bolts, wherein the pipe mount is configured to attach one or more antenna elements thereto.

13. The antenna mount assembly of claim 12, wherein the pipe mount is in the form of a cylindrical tube.

14. The antenna mount assembly of claim 13, wherein the pipe mount is configured to attach a first antenna element above the pipe mount attachment element and a second antenna element below the pipe mount attachment element.

* * * * *